United States Patent
Kim (10) Patent No.: US 9,251,804 B2
(45) Date of Patent: Feb. 2, 2016

(54) SPEECH RECOGNITION

(71) Applicant: Empire Technology Development LLC, Wilmington, DE (US)

(72) Inventor: Seungil Kim, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 205 days.

(21) Appl. No.: 13/878,357

(22) PCT Filed: Nov. 21, 2012

(86) PCT No.: PCT/US2012/066317
§ 371 (c)(1),
(2) Date: Apr. 8, 2013

(87) PCT Pub. No.: WO2014/081429
PCT Pub. Date: May 30, 2014

(65) Prior Publication Data
US 2014/0142934 A1 May 22, 2014

(51) Int. Cl.
| | |
|---|---|
| *G10L 15/20* | (2006.01) |
| *G10L 21/0208* | (2013.01) |
| *G10L 15/22* | (2006.01) |
| *H04W 4/02* | (2009.01) |
| *G10L 15/26* | (2006.01) |

(52) U.S. Cl.
CPC ............ *G10L 21/0208* (2013.01); *G10L 15/20* (2013.01); *G10L 15/22* (2013.01); *H04W 4/025* (2013.01); *G10L 15/265* (2013.01)

(58) Field of Classification Search
CPC ..... H04W 4/025; H04W 12/06; H04W 4/023; H04W 4/206; H04L 67/22; G10L 21/0208; G10L 15/20; G10L 15/22; G10L 15/265; G10L 2015/228

USPC ............ 455/411, 575.2, 63.1; 704/226–228, 704/233, 231
See application file for complete search history.

(56) References Cited

U.S. PATENT DOCUMENTS

| | | | |
|---|---|---|---|
| 5,774,859 A * | 6/1998 | Houser et al. ................. | 704/275 |
| 6,219,645 B1 | 4/2001 | Byers | |
| 2004/0260547 A1 | 12/2004 | Cohen | |
| 2006/0222184 A1* | 10/2006 | Buck et al. .................. | 381/71.1 |
| 2008/0172231 A1 | 7/2008 | Parisel et al. | |

(Continued)

OTHER PUBLICATIONS

International Search Report from International Application No. PCT/US12/66317 mailed Jan. 31, 2013.

(Continued)

*Primary Examiner* — Vijay B Chawan
(74) *Attorney, Agent, or Firm* — Brundidge & Stanger, P.C.

(57) ABSTRACT

Technologies are generally described for a speech recognition scheme. In some examples, a method performed under control of a speech recognition system may include receiving, from a first device, first data including a first signal captured by the first device, first location information of the first device, and first time information corresponding to the captured first signal; cancelling first noise from the captured first signal based at least in part on the first location information and the first time information, and estimating a first voice signal of a first user of the first device, wherein the first noise is associated with a second voice signal of a second user of a second device located adjacent to the first device; and translating the first voice signal into a first command for the first device.

26 Claims, 6 Drawing Sheets

(56) References Cited

U.S. PATENT DOCUMENTS

| | | | |
|---|---|---|---|
| 2009/0055170 | A1 | 2/2009 | Nagahama |
| 2010/0041447 | A1* | 2/2010 | Graylin ............... 455/575.2 |
| 2011/0022389 | A1 | 1/2011 | Kim et al. |
| 2011/0035220 | A1 | 2/2011 | Opaluch |
| 2011/0257974 | A1* | 10/2011 | Kristjansson et al. ....... 704/246 |
| 2011/0300806 | A1* | 12/2011 | Lindahl et al. ............. 455/63.1 |
| 2013/0024197 | A1* | 1/2013 | Jang et al. ................. 704/246 |
| 2013/0060571 | A1* | 3/2013 | Soemo et al. .............. 704/251 |
| 2013/0073293 | A1* | 3/2013 | Jang et al. ................. 704/275 |

OTHER PUBLICATIONS

R. Xia., "iPhone Virtual Assistant Siri has her flaws, but she's learning" Los Angeles Times, Dec. 4, 2011.

S. Rennie, et al., "Single-Channel Speech Separation and Recognition Using Loopy Belief Propagation", 2009, IEEE, pp. 3845-3848.

Y. Cao, et al., Multichannel Speech Separation by Eigendecomposition and Its Application to Co-Talker Interference Removal, IEEE Transactions on Speech and Audio Processing, vol. 5, No. 3, May 1997, pp. 209-219.

* cited by examiner

SPEECH RECOGNITION

This Application is the National Stage filing under 35 U.S.C. §371 of PCT Application Ser. No. PCT/US12/66317 filed on Nov. 21, 2012. The disclosure of the PCT Application is hereby incorporated herein by reference in its entirety.

BACKGROUND

Speech recognition has been commonplace in various fields. For example, many applications for high-end electronic devices (e.g., smartphones, tablets, etc.) have been developed for providing natural language user interfaces using speech recognition, such as Siri™ of Apple Inc., voice keyboard of Google Inc., and so on. A speech recognition system translates a user's voice into a machine-executable command, so that the user can just speak to manipulate his/her device.

SUMMARY

In an example, a speech recognition system may include a receiver configured to receive first data from a first device and second data from a second device, wherein the first data includes a first signal captured by the first device, and first location information of the first device, and wherein the second data includes a second signal captured by the second device, and second location information of the second device; a noise canceller configured to cancel first noise from the captured first signal based at least in part on the first location information and the second location information, and further configured to estimate a first voice signal of a first user of the first device, wherein the first noise is associated with a second voice signal of a second user of the second device; and a speech recognizer configured to translate the first voice signal into a first command for the first device.

In another example, a method performed under control of a speech recognition system may include receiving, from a first device, first data including a first signal captured by the first device, first location information of the first device, and first time information corresponding to the captured first signal; cancelling first noise from the captured first signal based at least in part on the first location information and the first time information, and estimating a first voice signal of a first user of the first device, wherein the first noise is associated with a second voice signal of a second user of a second device located adjacent to the first device; and translating the first voice signal into a first command for the first device.

In yet another example, a computer-readable storage medium may store thereon computer-executable instructions that, in response to execution, cause a speech recognition system to perform operations, including receiving from a first device first data including a first signal captured by the first device, first location information of the first device and first time information corresponding to the captured first signal; receiving from a second device second data including a second signal captured by the second device, second location information of the second device and second time information corresponding to the captured second signal; determining whether the first device and the second device are adjacent to each other based at least in part on the first location information and the second location information; determining whether the capture of the first signal and the capture of the second signal overlap in time based at least in part on the first time information and the second time information, when determining that the first device and the second device are adjacent to each other; cancelling first noise from the captured first signal and estimating a first voice signal of a first user of the first device, when determining that the first device and the second device are adjacent to each other and the capture of the first signal and the capture of the second signal overlap in time, the first noise being associated with a second voice signal of a second user of the second device; and translating the first voice signal into a first command for the first device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a speech recognition scheme. Further, technologies are herein generally described for extracting each user's voice signal when multiple users in a same place request speech recognition at a same time.

In some examples, when a first user of a first device decides to interact with the first device via a voice user interface, the first user may speak into a microphone corresponding to the first device, and the first device may capture a first signal including not only the first user's voice signal but also noise surrounding the first device, for example, by the microphone. Examples of the first device may include, but are not limited to, a smartphone, a mobile phone, a personal digital assistant (PDA), a tablet, a laptop computer, a desktop computer, a home appliance, a navigation device, and any other devices capable of capturing sound surrounding the first device.

In some examples, the first device may transmit the captured first signal to a speech recognition system for analyzing the first signal and obtain, from the speech recognition system, a first command associated with the first user's voice signal, which is to be executed by the first device. The speech recognition system may be a component of a speech recognition server, or may be controlled by one or more segments of a server farm or a server cluster for speech recognition.

In some examples, when a second user in the vicinity of the first user speaks into a microphone corresponding to a second device at the same time that the first device is capturing the first user's voice signal, the first signal captured by the first device may include not only the first user's voice signal but also the second user's voice signal. That is, the relative locations of the first device and the second device may be such that the first device may capture the second user's voice signal and the second device may capture the first user's voice signal. In such cases, the speech recognition system may extract the first user's voice signal from the first signal captured by the first device, and may generate the first command associated with the first user's voice signal based at least in part on the extracted first user's voice signal. That is, the speech recognition system may effectively filter out at least the second user's voice signal from the first signal captured by the first device.

In some examples, the speech recognition system may receive from the first device first data including the first signal captured by the first device, location information of the first device, and time information corresponding to the first signal. By way of example, but not limitation, the location information of the first device may include at least one of a GPS (Global Positioning System) coordinate of the first device, Wi-Fi access point information of the first device, cell information of a cellular network accessed by the first device, a location identification of the first device, and information of other devices detected by the first device over NFC (Near Field Communication) network, ZigBee network, Bluetooth network or Wi-Fi network, etc. By way of example, but not limitation, the time information corresponding to the first signal may include a start time and/or an end time of the first signal. In some examples, the speech recognition system may further receive from the second device second data including a second signal captured by the second device, location information of the second device, and time information corresponding to the second signal. Similarly, the location information of the second device may include, but are not limited to, at least one of a GPS coordinate of the second device, Wi-Fi access point information of the second device, cell information of a cellular network accessed by the second device, a location identification of the second device, and information of other devices detected by the second device over NFC network, ZigBee network, Bluetooth network or Wi-Fi network, etc. Further, the time information corresponding to the second signal may include, but are not limited to, a start time of the second signal and an end time of the second signal.

Then, in some examples, the speech recognition system may determine whether the second device is located adjacent to the first device based at least in part on the location information of the two devices. When the speech recognition system determines that the two devices are adjacent to each other, the speech recognition system may determine whether the capturing of the signal by the first device and the capturing of the signal by the second device overlap in time based at least in part on the time information corresponding to the signals respectively captured by the two devices. When the speech recognition system determines that the two devices are adjacent to each other and the capturing of the signals by the two devices overlaps in time, the speech recognition system may cancel, from the first signal, first noise associated with the second user's voice signal to estimate the first user's voice signal. Then, the speech recognition system may translate the first user's voice signal into the first command, and transmit the first command to the first device. Similarly, the speech recognition system may cancel, from the second signal, second noise associated with the first user's voice signal to estimate the second user's voice signal, translate the second user's voice signal into a second command, and transmit the second command to the second device.

Optionally, in some examples, the speech recognition system may calculate a correlation coefficient between the captured first signal and the captured second signal, and determine whether the first user's voice signal and the second user's voice signal interfere with each other based at least in part on the calculated correlation coefficient. In such cases, the speech recognition system may cancel the first noise from the first signal and/or cancel the second noise from the second signal when the first user's voice signal and the second user's voice signal interfere with each other.

Figure 1:
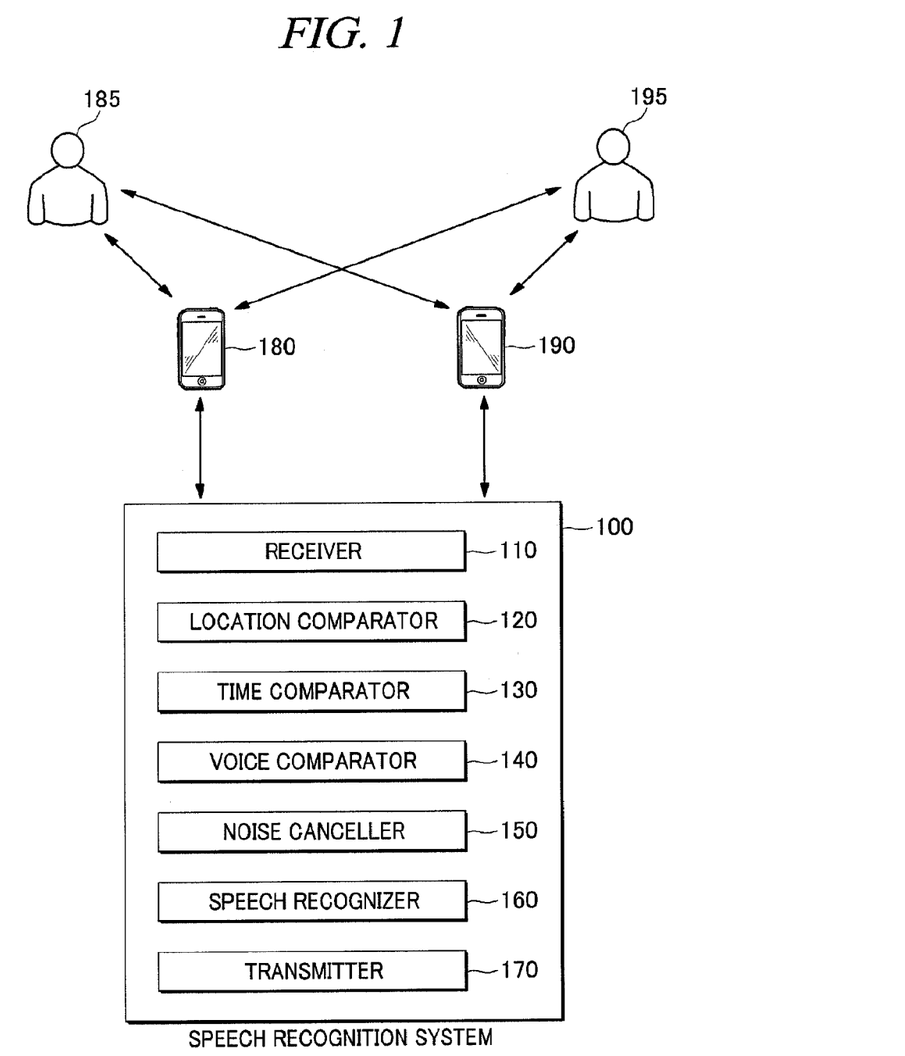
FIG. 1 shows a schematic block diagram illustrating an example architecture of a speech recognition system, arranged in accordance with at least some embodiments described herein.

FIG. 1 shows a schematic block diagram illustrating an example architecture of a speech recognition system 100, arranged in accordance with at least some embodiments described herein.

As depicted in FIG. 1, speech recognition system 100 may receive a request for speech recognition from a first device 180 and/or a second device 190, perform a speech recognition process, and output a result of the speech recognition to first device 180 and/or second device 190. Speech recognition system 100 may be a component of a speech recognition server, or may be controlled by one or more segments of a server farm or a server cluster for speech recognition. Examples of first device 180 and second device 190 may include, but are not limited to, a smartphone, a mobile phone, a personal digital assistant (PDA), a tablet, a laptop computer, a desktop computer, a home appliance, a navigation device, and any other devices capable of capturing surrounding sounds. Although FIG. 1 illustrates that two devices interact with speech recognition system 100, those skilled in the art will appreciate that any number of devices may interact with speech recognition system 100.

In some embodiments, speech recognition system 100 may include a receiver 110, a location comparator 120, a time comparator 130, a voice comparator 140, a noise canceller 150, a speech recognizer 160, and a transmitter 170. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Receiver 110 may be configured to receive first data from first device 180 and second data from second device 190, when a first user 185 of first device 180 and a second user 195 of second device 190 utilize the speech recognition system simultaneously, in whole or in part.

Figure 2:
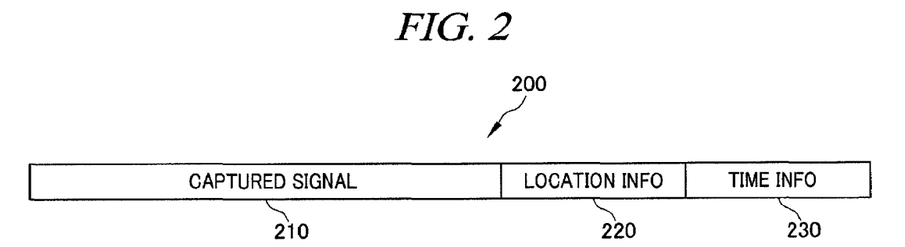
FIG. 2 schematically shows an example of a data structure to be used for speech recognition, arranged in accordance with at least some embodiments described herein.

FIG. 2 schematically shows an example of a data structure 200 to be used for speech recognition, arranged in accordance with at least some embodiments described herein. In some embodiments, the first data and the second data referred to in the description of FIG. 1 may have a data structure 200 including a captured signal 210, location information 220 and time information 230. By way of example, but not limitation, location information 220 may include GPS (Global Positioning System) coordinate of a corresponding device, Wi-Fi access point information of the corresponding device, cell information of a cellular network accessed by the corresponding device, a location identification of the corresponding device which has been granted to a group of devices connected to one another by NFC (Near Field Communication), ZigBee, Bluetooth or Wi-Fi, and/or information of other devices detected by the corresponding device over NFC network, ZigBee network, Bluetooth network or Wi-Fi network, etc. By way of example, but not limitation, time information 230 may include a start time and/or an end time of captured signal 210.

Referring back to FIG. 1, the first data may include a first signal $X_A$ captured by first device 180 (e.g., by a microphone of first device 180), first location information of first device 180, and first time information corresponding to first signal $X_A$ captured by first device 180; and the second data may include a second signal $X_B$ captured by second device 190 (e.g., by a microphone of second device 190), second location information of second device 190, and second time information corresponding to second signal $X_B$ captured by second device 190.

In some embodiments, when the relative locations of first device 180 and second device 190 are such that first device 180 may capture voice of second user 195 and second device 190 may capture voice of first user 185, first signal $X_A$ captured by first device 180 and second signal $X_B$ captured by second device 190 may be represented as follows:

$$X_A = H_{AA}S_A + H_{AB}S_B \quad (1);$$

and $$X_B = H_{BA}S_A + H_{BB}S_B \quad (2),$$

in which $S_A$ denotes a first voice signal of first user 185, $S_B$ denotes a second voice signal of second user 195, $H_{AA}$ denotes an impulse response between first user 185 and first device 180, $H_{BA}$ denotes an impulse response between first user 185 and second device 190, $H_{AB}$ denotes an impulse response between second user 195 and first device 180, and $H_{BB}$ denotes an impulse response between second user 195 and second device 190.

Location comparator 120 may be configured to compare the first location information and the second location information received by receiver 110, and determine whether first device 180 and second device 190 are adjacent to each other based thereon. By way of example, but not limitation, location comparator 120 may measure or estimate a distance between first device 180 and second device 190 based at least in part on GPS coordinates and/or cell information of first device 180 and second device 190, and determine whether first device 180 and second device 190 are adjacent to each other based at least in part on the distance. In such cases, a threshold distance for determining whether first device 180 and second device 190 are adjacent to each other such that each device may capture voice signals intended for the other device may be set as, for example, 20 m, 15 m, 10 m, 5 m, etc., depending on the desired implementation. By way of another example, but not limitation, location comparator 120 may determine that first device 180 and second device 190 are adjacent to each other when the two devices access a same Wi-Fi access point, when the two devices respectively detect a same device over NFC (Near Field Communication) network, ZigBee network, Bluetooth network or Wi-Fi network, and/or the two devices detect each other over NFC network, ZigBee network, Bluetooth network or Wi-Fi network. By way of yet another example, but not limitation, location comparator 120 may determine that first device 180 and second device 190 are adjacent to each other when the two devices have a same location identification, which has been granted to a group of devices connected to one another by NFC (Near Field Communication), ZigBee, Bluetooth or Wi-Fi.

Time comparator 130 may be configured to compare the first time information and the second time information received by receiver 110, and to determine whether the capture of first signal $X_A$ and the capture of second signal $X_B$ by the respective devices overlap in time based thereon.

Figure 3:
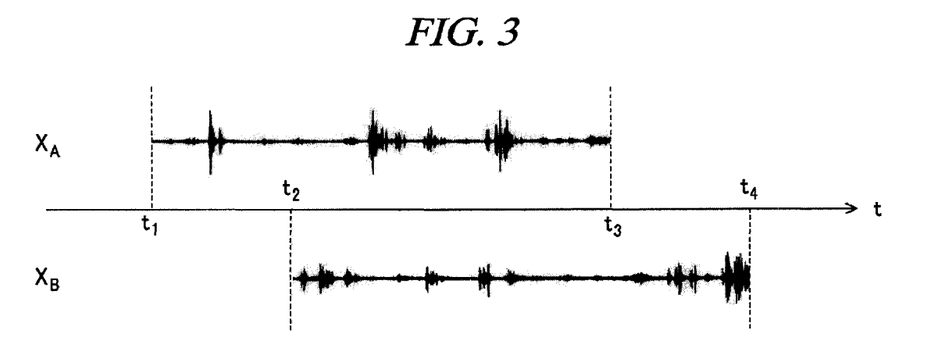
FIG. 3 schematically shows an illustrative example of captured voice signals of users, arranged in accordance with at least some embodiments described herein.

FIG. 3 schematically shows an illustrative example of captured voice signals of users, arranged in accordance with at least some embodiments described herein. Referring back to FIG. 1, by way of example but not limitation, when first signal $X_A$ starts at $t_1$ and ends at $t_3$, and second signal $X_B$ starts at $t_2$ and ends at $t_4$, as illustrated in FIG. 3, time comparator 130 may determine that the capture of first signal $X_A$ and the capture of second signal $X_B$ overlaps in time, i.e., during between $t_2$ and $t_3$.

Voice comparator 140 may be configured to calculate a correlation coefficient between first signal $X_A$ and second signal $X_B$, and to determine whether first voice signal $S_A$ of first user 185 and second voice signal $S_B$ of second user 195 interfere with each other based at least in part on the correlation coefficient. That is, voice comparator 140 may reconfirm whether first device 180 has captured the voice of second user 195 and/or whether second device 190 has captured the voice of first user 185. A sufficiently high correlation coefficient may mean that first user 185 and second user 195 are close enough in distance, i.e., adjacent, to cause interference between their voice signals. On the contrary, a sufficiently low correlation coefficient may mean that the voice signals of first user 185 and second user 195 do not interfere with each other even though first device 180 and second device 190 are located adjacent to each other.

Noise canceller 150 may be configured to cancel, from first signal $X_A$, first noise associated with second voice signal $S_B$ of second user 195, based at least in part on the first location information, the second location information, the first time information, and the second time information received by receiver 110. In some embodiments, noise canceller 150 may cancel the first noise from first signal $X_A$, when location comparator 120 determines that the relative locations of first device 180 and second device 190 are such that each device may capture voice signals intended for the other device, and time comparator 130 determines that the capture of first signal $X_A$ and the capture of second signal $X_B$ overlap in time. In some alternative embodiments, noise canceller 150 may cancel the first noise from first signal $X_A$, when location comparator 120 determines that the relative locations of first device 180 and second device 190 are such that each device may capture voice signals intended for the other device, time comparator 130 determines that the capture of first signal $X_A$ and the capture of second signal $X_B$ overlap in time, and voice comparator 140 reconfirms that first voice signal $S_A$ and second voice signal $S_B$ interfere with each other. By cancelling the first noise from first signal $X_A$, noise canceller 150 may estimate first voice signal $S_A$ of first user 185.

Figure 4A:
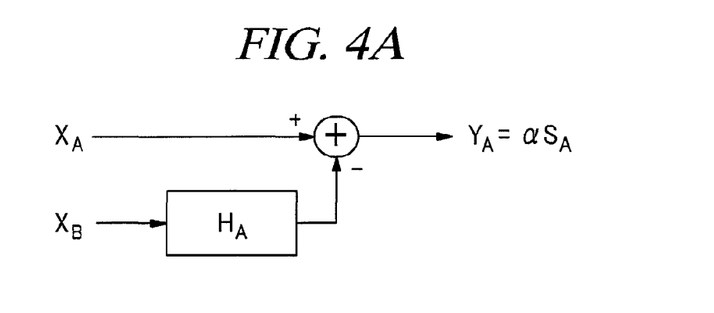
FIGS. 4A-4B schematically show illustrative examples of a noise cancelling filter, arranged in accordance with at least some embodiments described herein.
Figure 4B:
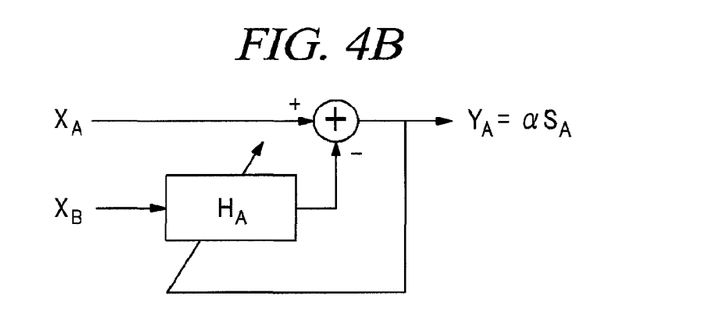

FIGS. 4A-4B schematically show illustrative examples of a noise cancelling filter, arranged in accordance with at least some embodiments described herein. In some embodiments, noise canceller 150 may include a noise cancelling filter, as illustrated in FIG. 4A. When $H_A$ denotes a filter coefficient of the noise cancelling filter for extracting first voice signal $S_A$ of first user 185 from first signal $X_A$, an output $Y_A$ of the noise cancelling filter may be defined as follows:

$$Y_A = X_A - H_A X_B = \alpha S_A \quad (3),$$

in which $H_A$ and $\alpha$ may be respectively obtained from formulae (1) and (2) as follows:

$$H_A = H_{AB}/H_{BB} \quad (4);$$

and $$\alpha = H_{AA} - H_{BA} H_{AB}/H_{BB} \quad (5).$$

In some embodiments, when it is not simple to measure $H_{AB}$ and $H_{BB}$, noise canceller 150 may employ an adaptive filter as illustrated in FIG. 4B to estimate filter coefficient $H_A$. In such cases, noise canceller 150 may perform a process of estimating of filter coefficient $H_A$ for a duration in which first signal $X_A$ and second signal $X_B$ overlap (e.g., from $t_2$ to $t_3$ in FIG. 3). In some embodiments, when the duration is too short to estimate filter coefficient $H_A$, first signal $X_A$ and second signal $X_B$ in the duration may be extended in cascade to compose a reference signal.

Referring back to FIG. 1, in a similar manner, noise canceller 150 may cancel from second signal $X_B$ second noise associated with first voice signal $S_A$ of first user 185, based at least in part on the first location information, the second location information, the first time information, and the second time information received by receiver 110, and estimate second voice signal $S_B$.

Speech recognizer 160 may be configured to translate first voice signal $S_A$, which may be estimated by noise canceller 150, into a first command to be executed by first device 180. Speech recognizer 160 may also be configured to translate second voice signal $S_B$, which may be estimated by noise canceller 150, into a second command to be executed by second device 190.

Transmitter 170 may be configured to transmit the first command to first device 180, and/or the second command to second device 190.

As such, speech recognition system 100 may reduce a potential recognition error, and provide first user 185 and/or second user 195 with better speech recognition experience.

Figure 5:
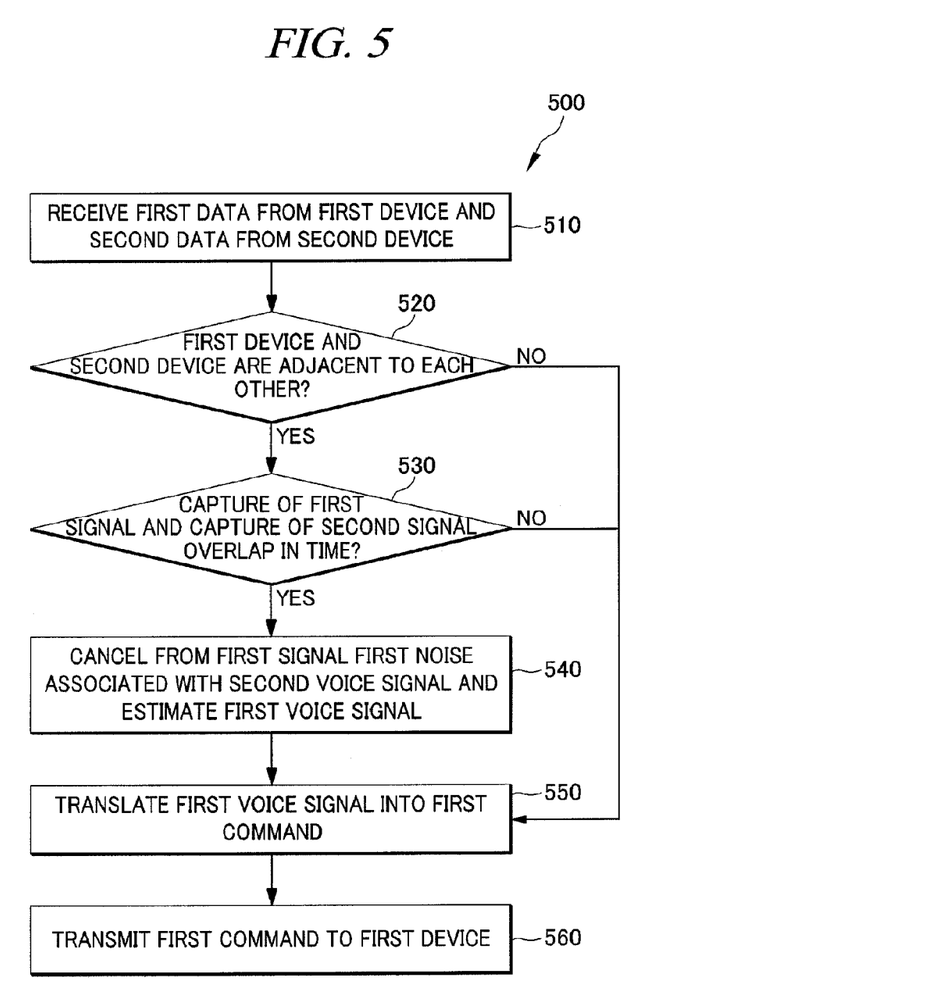
FIG. 5 shows an example flow diagram of a process for providing a speech recognition scheme, arranged in accordance with at least some embodiments described herein.

FIG. 5 shows an example flow diagram of a process 500 for providing a speech recognition scheme, arranged in accordance with at least some embodiments described herein.

Process 500 may be implemented in a speech recognition system such as speech recognition system 100 including receiver 110, location comparator 120, time comparator 130, voice comparator 140, noise canceller 150, speech recognizer 160, and transmitter 170, described above. Process 500 may include one or more operations, actions, or functions as illustrated by one or more blocks 510, 520, 530, 540, 550 and/or 560. Although illustrated as discrete blocks, various blocks may be divided into additional blocks, combined into fewer blocks, or eliminated, depending on the desired implementation. Processing may begin at block 510.

At block 510 (Receive First Data from First Device and Second Data from Second Device), speech recognition system 100 may receive from first device 180 the first data including first signal $X_A$ captured by first device 180, the first location information of first device 180 and the first time information corresponding to first signal $X_A$; and receive from second device 190 the second data including second signal $X_B$ captured by second device 190, the second location information of second device 190 and the second time information corresponding to second signal $X_B$. Processing may continue from block 510 to decision block 520.

At decision block 520 (First Device and Second Device are Adjacent to Each Other?), speech recognition system 100 may determine whether first device 180 and second device 190 are adjacent to each other based at least in part on the first location information and the second location information. When it is determined that first device 180 and second device 190 are adjacent to each other, processing may continue from decision block 520 to decision block 530. Otherwise, processing may continue from decision block 520 to block 550.

At decision block 530 (Capture of First Signal and Capture of Second Signal Overlap in Time?), speech recognition system 100 may determine whether the capture of first signal $X_A$ and the capture of second signal $X_B$ overlap in time based at least in part on the first time information and the second time information. When it is determined that the capture of first signal $X_A$ and the capture of second signal $X_B$ overlap in time, processing may continue from decision block 530 to block 540. Otherwise, processing may continue from decision block 530 to block 550.

At block 540 (Cancel from First Signal First Noise Associated with Second Voice Signal and Estimate First Voice Signal), speech recognition system 100 may cancel from first signal $X_A$ the first noise associated with second voice signal $S_B$, which was spoken by second user 195 into second device 190, and estimate first voice signal $S_A$, spoken by first user 185 into first device 180. Processing may continue from block 540 to block 550.

At block 550 (Translate First Voice Signal into First Command), speech recognition system 100 may translate first voice signal $S_A$ into the first command for first device 180. First voice signal $S_A$ to be translated may be estimated at block 540, or otherwise first signal $X_A$ received at block 510. Processing may continue from block 550 to block 560.

At block 560 (Transmit First Command to First Device), speech recognition system 100 may transmit the first command to first device 180.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
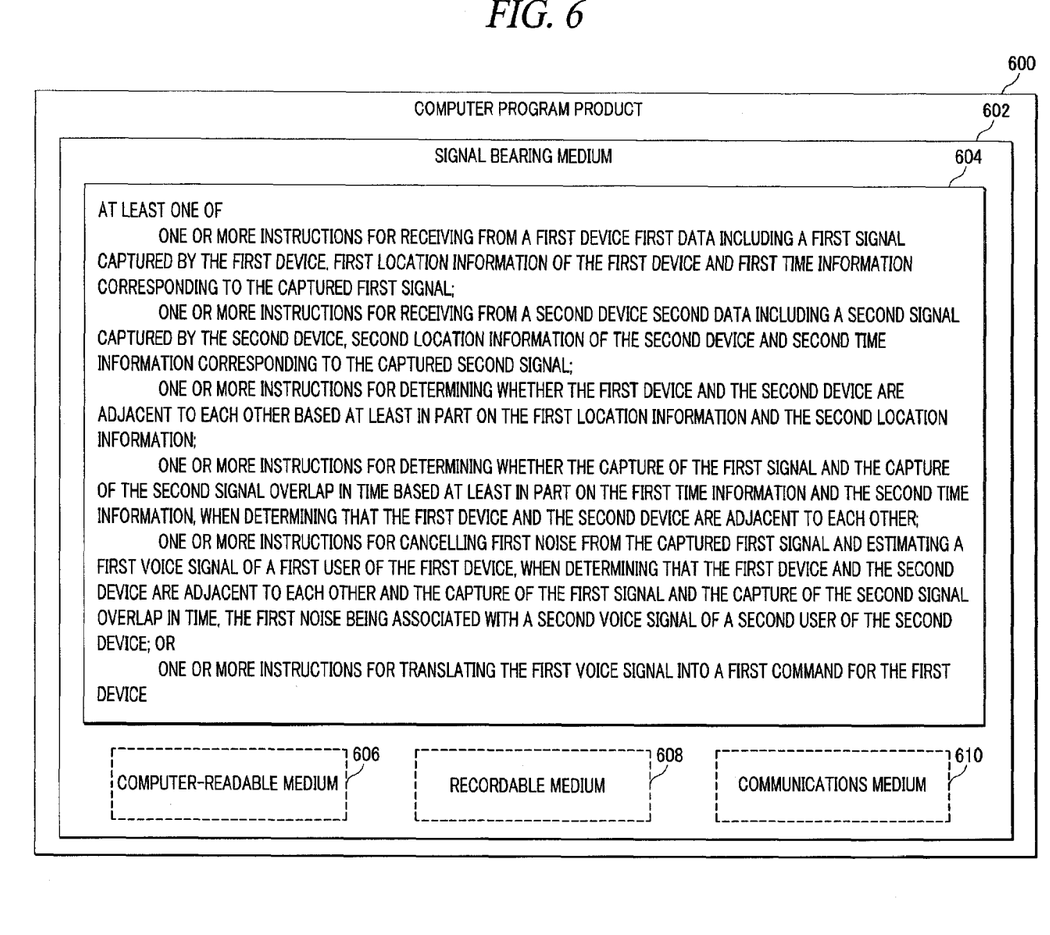
FIG. 6 illustrates an example computer program product that may be utilized to provide a speech recognition scheme, arranged in accordance with at least some embodiments described herein.

FIG. 6 illustrates an example computer program product that may be utilized to provide a speech recognition scheme, arranged in accordance with at least some embodiments described herein.

Computer program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for receiving from a first device first data including a first signal captured by the first device, first location information of the first device and first time information corresponding to the captured first signal; one or more instructions for receiving from a second device second data including a second signal captured by the second device, second location information of the second device and second time information corresponding to the captured second signal; one or more instructions for determining whether the first device and the second device are adjacent to each other based at least in part on the first location information and the second location information; one or more instructions for determining whether the capture of the first signal and the capture of the second signal overlap in time based at least in part on the first time information and the second time information, when determining that the first device and the second device are adjacent to each other; one or more instructions for cancelling first noise from the captured first signal and estimating a first voice signal of a first user of the first device, when determining that the first device and the second device are adjacent to each other and the capture of the first signal and the capture of the second signal overlap in time, the first noise being associated with a second voice signal of a second user of the second device; or one or more instructions for translating the first voice signal into a first command for the first device. Thus, for example, referring to FIG. 1, speech recognition system 100 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to one or more modules of speech recognition system 100 by an RF signal bearing medium 602, where the signal bearing medium 602 is conveyed by a wireless communications medium 610 (e.g., a wireless communications medium conforming with the IEEE 802.11 standard).

Figure 7:
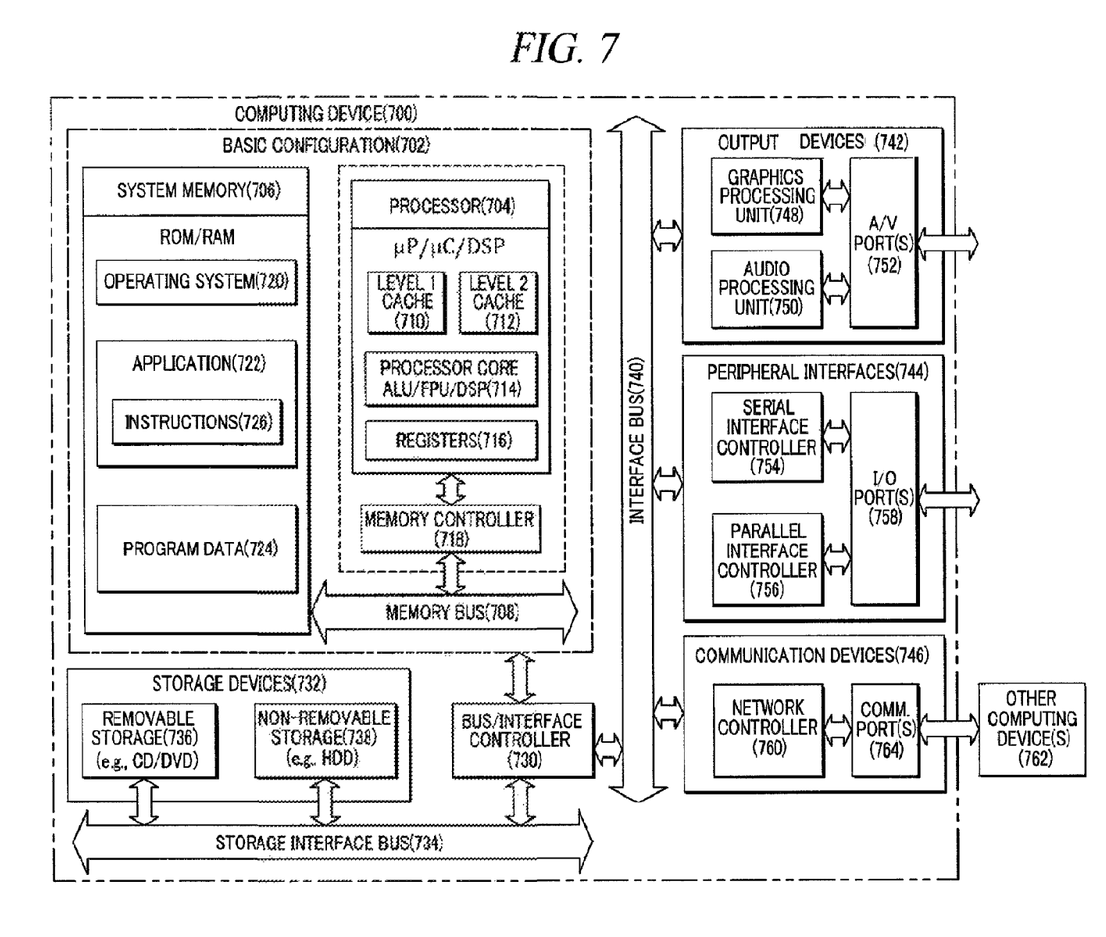
FIG. 7 is a block diagram illustrating an example computing device that may be utilized to provide a speech recognition scheme, arranged in accordance with at least some embodiments described herein.

FIG. 7 is a block diagram illustrating an example computing device that may be utilized to provide a speech recognition scheme, arranged in accordance with at least some embodiments described herein.

In these examples, elements of computing device 700 may be arranged or configured for a server. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the speech recognition system 100 architecture as shown in FIG. 1 or including the actions described with respect to the flow charts shown in FIG. 5. In some examples, application 722 may be arranged to operate with program data 724 on an operating system 720 such that implementations for instructions for a computing system as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A speech recognition system, comprising:
   a receiver configured to receive first data from a first device of a first user and second data from a second device of a second user,
   wherein the first data includes a first voice signal captured by the first device, and first location information of the first device, and
   wherein the second data includes a second voice signal captured by the second device, and second location information of the second device;
   a noise canceller configured to cancel first noise from the captured first voice signal based at least in part on the first location information and the second location information, wherein the first noise is associated with the second voice signal of the second user of the second device; and
   a speech recognizer configured to translate the first voice signal into a first command for the first device.

2. The speech recognition system of claim 1, further comprising:
   a location comparator configured to compare the first location information and the second location information to determine whether the first device and the second device are adjacent to each other.

3. The speech recognition system of claim 1, wherein the first location information includes at least one of a GPS (Global Positioning System) coordinate of the first device, Wi-Fi access point information of the first device, cell information of a cellular network accessed by the first device, a location identification of the first device, and information of other devices detected by the first device, and
   wherein the second location information includes a GPS coordinate of the second device, Wi-Fi access point information of the second device, cell information of a cellular network accessed by the second device, a location identification of the second device, and information of other devices detected by the second device.

4. The speech recognition system of claim 1, wherein the first data further includes first time information corresponding to the captured first voice signal, and the second data further includes second time information corresponding to the captured second voice signal, and
   wherein the noise canceller is further configured to cancel the first noise from the captured first voice signal further based on the first time information and the second time information.

5. The speech recognition system of claim 4, further comprising:
   a time comparator configured to compare the first time information and the second time information to determine whether the capture of the first voice signal and the capture of the second voice signal overlap in time,
   wherein the first time information includes a start time of the first voice signal and an end time of the first voice signal, and
   wherein the second time information includes a start time of the second voice signal and an end time of the second voice signal.

6. The speech recognition system of claim 1, wherein the noise canceller is further configured to cancel second noise from the captured second voice signal, and further configured to estimate the second voice signal, wherein the second noise is associated with the first voice signal, and
   wherein the speech recognizer is further configured to translate the second voice signal into a second command for the second device.

7. The speech recognition system of claim 1, wherein the noise canceller utilizes an adaptive filtering algorithm.

8. The speech recognition system of claim 1, further comprising:
   a voice comparator configured to calculate a correlation coefficient between the captured first voice signal and the captured second voice signal.

9. The speech recognition system of claim 1, further comprising:
   a transmitter configured to transmit the first command to the first device.

10. A method performed under control of a speech recognition system, comprising:
    receiving, from a first device of a first user, first data including a first voice signal captured by the first device, first location information of the first device, and first time information corresponding to the captured first voice signal;
    receiving, from a second device of a second user, second data including a second voice signal captured by the second device;
    cancelling first noise from the captured first voice signal based at least in part on the first location information and the first time information, wherein the first noise is associated with the second voice signal of the second user of the second device located adjacent to the first device; and
    translating the first voice signal into a first command for the first device.

11. The method of claim 10, wherein the first location information includes at least one of a GPS (Global Positioning System) coordinate of the first device, Wi-Fi access point information of the first device, cell information of a cellular network accessed by the first device, a location identification of the first device, and information of other devices detected by the first device.

12. The method of claim 10, wherein the first time information includes a start time of the first voice signal and an end time of the first voice signal.

13. The method of claim 10, further comprising:
    transmitting the first command to the first device.

14. The method of claim 10, further comprising:
    receiving, from the second device, second data including the second voice signal captured by the second device, second location information of the second device and second time information corresponding to the captured second voice signal;
    determining whether the first device and the second device are adjacent to each other based at least in part on the first location information and the second location information; and
    determining whether the capture of the first voice signal and the capture of the second voice signal overlap in time based at least in part on the first time information and the second time information, when determining that the first device and the second device are adjacent to each other,
    wherein the cancelling includes cancelling the first noise from the captured first voice signal, when determining that the first device and the second device are adjacent to each other and the capture of the first voice signal and the capture of the second voice signal overlap in time.

15. The method of claim 14, wherein the second location information includes a GPS coordinate of the second device, Wi-Fi access point information of the second device, cell information of a cellular network accessed by the second device, a location identification of the second device, and information of other devices detected by the second device.

16. The method of claim 14, wherein the second time information includes a start time of the second voice signal and an end time of the second voice signal.

17. The method of claim 14, further comprising:
calculating a correlation coefficient between the captured first voice signal and the captured second voice signal, and
determining whether the first voice signal and the second voice signal interfere with each other based at least in part on the calculated correlation coefficient.

18. The method of claim 14, further comprising:
cancelling from the captured second voice signal second noise which is associated with the first voice signal and estimating the second voice signal; and
translating the second voice signal into a second command for the second device.

19. The method of claim 18, further comprising:
transmitting the second command to the second device.

20. A non-transitory computer-readable storage medium having stored thereon computer-executable instructions that, in response to execution, cause a speech recognition system to perform operations, comprising:
receiving, from a first device of a first user, first data including a first voice signal captured by the first device, first location information of the first device and first time information corresponding to the captured first voice signal;
receiving, from a second device of a second user, second data including a second voice signal captured by the second device, second location information of the second device and second time information corresponding to the captured second voice signal;
determining whether the first device and the second device are adjacent to each other based at least in part on the first location information and the second location information;
determining whether the capture of the first voice signal and the capture of the second voice signal overlap in time based at least in part on the first time information and the second time information, when determining that the first device and the second device are adjacent to each other;
cancelling first noise from the captured first voice signal when determining that the first device and the second device are adjacent to each other and the capture of the first voice signal and the capture of the second voice signal overlap in time, the first noise being associated with the second voice signal of the second user of the second device; and
translating the first voice signal into a first command for the first device.

21. The non-transitory computer-readable storage medium of claim 20, wherein the first location information includes at least one of a GPS (Global Positioning System) coordinate of the first device, Wi-Fi access point information of the first device, cell information of a cellular network accessed by the first device, a location identification of the first device, and information of other devices detected by the first device, and
wherein the second location information includes a GPS coordinate of the second device, Wi-Fi access point information of the second device, cell information of a cellular network accessed by the second device, a location identification of the second device, and information of other devices detected by the second device.

22. The non-transitory computer-readable storage medium of claim 20, wherein the first time information includes a start time of the first voice signal and an end time of the first voice signal, and
wherein the second time information includes a start time of the second voice signal and an end time of the second voice signal.

23. The non-transitory computer-readable storage medium of claim 20, wherein the operations further comprise:
calculating a correlation coefficient between the captured first voice signal and the captured second voice signal, and
determining whether the first voice signal and the second voice signal interfere with each other based at least in part on the calculated correlation coefficient.

24. The non-transitory computer-readable storage medium of claim 20, wherein the operations further comprise:
transmitting the first command to the first device.

25. The non-transitory computer-readable storage medium of claim 20, wherein the operations further comprise:
cancelling from the captured second voice signal second noise associated with the first voice signal and estimating the second voice signal, when determining that the first device and the second device are adjacent to each other and the capture of the first voice signal and the capture of the second voice signal overlap in time; and
translating the second voice signal into a second command for the second device.

26. The non-transitory computer-readable storage medium of claim 25, wherein the operations further comprise:
transmitting the second command to the second device.

* * * * *